(12) United States Patent
Ritmanich et al.

(10) Patent No.: US 10,237,234 B2
(45) Date of Patent: Mar. 19, 2019

(54) SYSTEM AND METHOD FOR AUTOMATED AND SEMIAUTOMATED CONFIGURATION OF FACILITY AUTOMATION AND CONTROL EQUIPMENT

(71) Applicant: ABB Inc., Cary, NC (US)

(72) Inventors: Kraig Ritmanich, Brookfield, WI (US); Teemu T. Heikkila, Helsinki (FI)

(73) Assignee: ABB, Inc., Cary, NC (US)

( * ) Notice: Subject to any disclaimer, the term of this patent is extended or adjusted under 35 U.S.C. 154(b) by 183 days.

(21) Appl. No.: 15/293,922

(22) Filed: Oct. 14, 2016

(65) Prior Publication Data

US 2017/0034123 A1 Feb. 2, 2017

Related U.S. Application Data

(63) Continuation of application No. PCT/US2014/034413, filed on Apr. 16, 2014.

(51) Int. Cl.
*H04L 29/12* (2006.01)
*H04L 29/08* (2006.01)

(52) U.S. Cl.
CPC ........ *H04L 61/2038* (2013.01); *H04L 61/103* (2013.01); *H04L 61/2046* (2013.01); *H04L 61/6022* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2007/0124444 | A1* | 5/2007 | Nogawa | H04L 41/00 709/223 |
| 2008/0191837 | A1* | 8/2008 | Stocker | H04L 12/403 340/3.51 |
| 2009/0271001 | A1 | 10/2009 | Westphal et al. | |
| 2009/0312853 | A1* | 12/2009 | Kore | G05B 19/4185 700/90 |
| 2014/0025842 | A1* | 1/2014 | Li | H04L 63/0876 709/245 |
| 2014/0173581 | A1* | 6/2014 | Grinberg | G06F 8/654 717/170 |

(Continued)

FOREIGN PATENT DOCUMENTS

WO 2008097434 A2 6/2008

OTHER PUBLICATIONS

Newman, et al. Broadcasting BACnet, ASHRAE Journal, Nov. 2010, 5 pages.

(Continued)

*Primary Examiner* — Kodzovi Acolatse
(74) *Attorney, Agent, or Firm* — Taft, Stettinius & Hollister LLP; J. Bruce Schelkopf

(57) ABSTRACT

A system and method for configuring devices on a device network in communication with a router on a control network. An unconfigured device installed on the network receives a poll at a predetermined address from a router. The router receives a response to the poll from the unconfigured device, and requests identification of devices having a range of device object IDs and stores the MAC addresses of responding devices and the device object IDs. The unconfigured device is configured to have the proposed MAC address and device object ID.

16 Claims, 3 Drawing Sheets

(56) References Cited

U.S. PATENT DOCUMENTS

| | | | | |
|---|---|---|---|---|
| 2014/0282486 A1* | 9/2014 | Hisamoto | ............... | G06F 8/65 |
| | | | | 717/173 |
| 2015/0006661 A1* | 1/2015 | Choi | ................. | H04L 61/2038 |
| | | | | 709/207 |
| 2015/0195671 A1* | 7/2015 | Seed | .................... | H04W 4/70 |
| | | | | 455/434 |

OTHER PUBLICATIONS

International Search Report, PCT/US2014/034413, ABB Inc., dated Jan. 16, 2015, 4 pages.

* cited by examiner

SYSTEM AND METHOD FOR AUTOMATED AND SEMIAUTOMATED CONFIGURATION OF FACILITY AUTOMATION AND CONTROL EQUIPMENT

FIELD OF INVENTION

The present disclosure concerns configuration of facility automation and control equipment. In particular, the present disclosure concerns facility automation and control equipment automatically configurable on a control network.

BACKGROUND

The BACnet communications protocol can be implemented to control and monitor facility automation and control equipment. The BACnet protocol includes network and application layers that can be implemented over several different data layer and physical layer protocols, as that term us used in the Open Systems Interconnection ("OSI") model (ISO/IEC 7498-1), such protocols including Ethernet protocol (IEEE 802.2), ARCNET and EIA-485. The EIA-485 physical layer is a commonly used physical layer standard in facility control systems. Since EIA-485 is a physical layer standard, it does not regulate access to the transmission medium. BACnet defines a Master-Slave/Token-Passing ("MS/TP") protocol to provide a data link layer function to complement the EIA-485 physical layer standard.

Building automation and control networks, such as those complying with the BACnet communications protocol, can include multiple automation and control devices. For proper operation of the building automation and control network and the devices connected to such a network, correct addresses can be required for each device on the network. For example, each MS/TP device installed in a BACnet building control system requires two addresses to be properly configured, and thus before the device can communicate over the BACnet network: the MAC address and the device object identifier ("device object ID"). The MAC address can be unique for each device on the local MS/TP network or bus, while the device object ID can be unique for each device over the entire BACnet automation and control network. Duplicate addresses can impair not only the function of the devices with the duplicate addresses, but the entire network. Such address conflicts can be time consuming to identify and fix. It is therefore desirable to select valid addressing information for a particular device, in particular upon installation of the device on the network.

SUMMARY

A system and method for configuring devices on a device network in communication with a router on a control network. An unconfigured device installed on the network receives a poll at a predetermined address from a router. The router receives a response to the poll from the unconfigured device, and requests identification of devices having a range of device object IDs and stores the MAC addresses of responding devices and the device object IDs. The unconfigured device is configured to have the proposed MAC address and device object ID.

BRIEF DESCRIPTION OF THE DRAWINGS

In the accompanying drawings, structures and methods are illustrated that, together with the detailed description provided below, describe aspects of a system and method for automated and semiautomated configuration of facility automation and control equipment. It will be noted that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
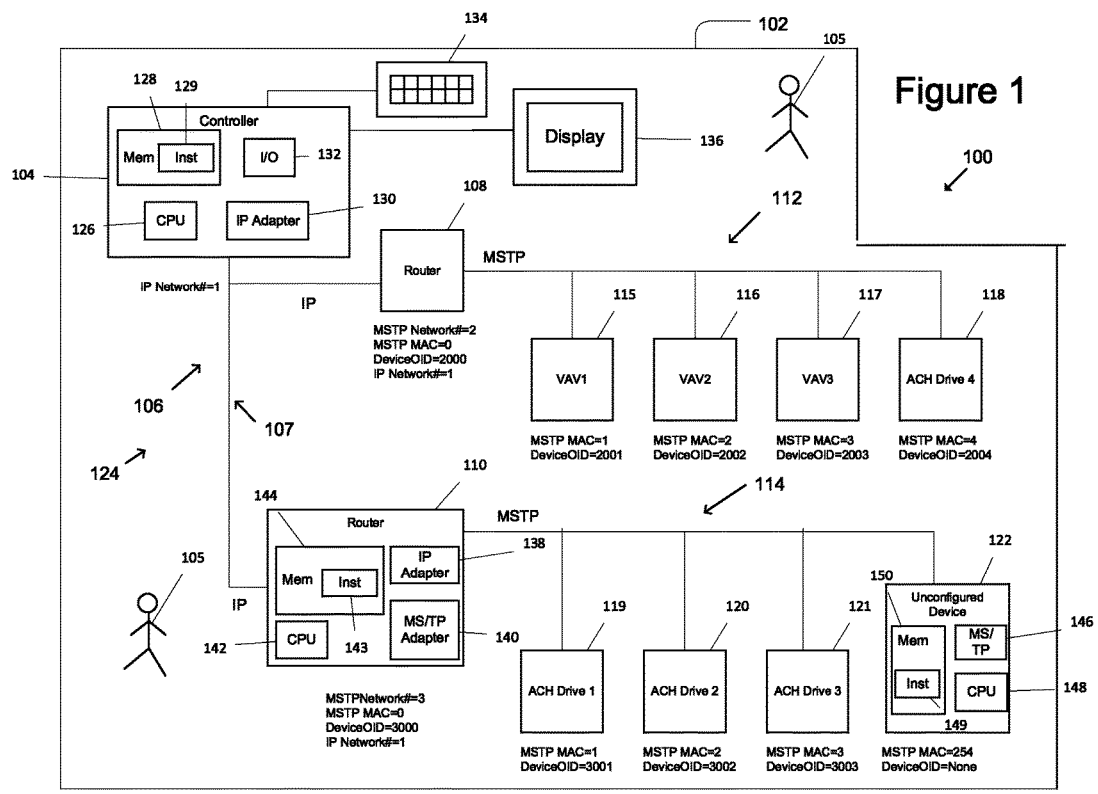
FIG. 1 illustrates a schematic of facility control system 100.

With reference to FIG. 1, a facility control system 100 of a facility 102 includes a controller 104 that can be, for example, an operator workstation with which an operator such as user 105 interfaces to monitor and control system 100. The control system 100 forms a control network 106 that is used to monitor and control facility automation and control equipment. Facility automation and control equipment can include, but is not limited to, HVAC control and drive equipment, fire detection and alarms, lighting, security equipment, elevators and doors. The control system 100 can be implemented in a variety of different forms of facilities 102, including but not limited to office buildings, industrial plants, warehouses, municipal infrastructure, residential structures, utility infrastructure or a variety of other commercial, industrial, governmental facilities that implement automation and control equipment.

The facility control network 106 includes the controller 104 and multiple routers 108, 110. The control network can include an IP protocol network operating over backbone network 107 connecting routers 108 and controller 104. The backbone network 107 allows for communication between and among the controller 104 and the routers 108, 110. Each of the routers 108, 110 form a terminal of a device branch network 112, 114. According to one aspect of the present teachings, the device networks 112, 114 have an underlying physical layer including RS-485 busses, on which physical layer MS/TP networks can operate. As seen in FIG. 1, router 108 serves as a terminal of device network 112, while router 110 serves as a terminal of device network 114. The routers 108, 110 enable communications of the devices 115-122 with the controller 104. For example, the routers 108, 110 can package data, commands, requests, and other information received from devices 115-122 over the device networks 112, 114 into a format that can be transmitted over the IP-based control network and received and understood by one or more of the other routers 108, 110 and the controller 104.

According to one aspect of the present teachings, the control system 100 includes a BACnet control network 124 implementing an IP protocol network for communications between routers 108, 110 and controller 104, and an MS/TP network for communications between devices 115-122 and respective routers 108, 110. The arrangement in FIG. 1 allows communication between the controller 104 and properly configured device devices 115-121 over the BACnet network 124. In the system 100 shown in FIG. 1, the devices 115-117 are variable air volume controls, abbreviated "VAV," while devices 118-121 are AC HVAC drives, abbreviated "ACH Drive." While the devices in FIG. 1 illustrate one possible selection and arrangement of devices, a variety of other types of BACnet compatible facility control and automation devices can be implemented in addition to those shown in FIG. 1, including but not limited to thermostats, thermistors, transmitters, lighting controls, security systems, fire detection and alarms, escalator/elevator controllers, and actuators. A selection of devices can be arranged in a variety of network topologies permissible for a facility control system operating devices under a BACnet protocol.

A device, such as devices 115-121 can be assigned a device object ID, which is a unique number given to each device or router over the entire BACnet network 124, and a MAC address, which is a unique number over the device network 112, 114 on which the device or router resides. Thus, router 108 is assigned a MAC address of 0, and a device object ID, abbreviated in FIG. 1 as "DeviceOID," of 2000. Devices 115-118, which are installed and properly configured to operate on device network 112, are assigned MAC addresses 1-4, respectively. Further, devices 115-118 are assigned device object IDs 2001-2004, respectively. Similarly, router 110 is assigned a MAC address of 0 and a device object ID of 3000. The MAC addresses of routers 108 and 11 do not conflict because the two routers 108, 110 reside on different MS/TP device branch networks 112, 114. Configured devices 119-121, which are installed and configured to reside on device network 114, are assigned MAC addresses 1-4, respectively. Devices 119-121 can be assigned device object IDs 3001-3003, respectively.

According to another aspect of the present teachings, each IP or MS/TP network on a BACnet control network 124 can be assigned a unique network number. Thus, the IP backbone network 107 is assigned network number 1, while the MS/TP branch network 112 is assigned network number 2 and the MS/TP branch network 114 is assigned network number 3.

According to one aspect of the present teachings, the controller 104 includes a processor 126 for processing and executing computer instructions that can be stored, for example, on memory 128, which can take any of a variety of forms, such as a solid state or disc-based hard disk drive, random access memory, flash memory or any other form of non-transient computer readable media. Instructions 129 to be carried out by the processor 126, such as instructions to carry out methods according to the present teachings, can be stored on the memory 128. Network adapter 130 can be, for example, a UDP/IP compatible network adapter. Input/Output ("I/O") adapter 132 manages communications of the controller 104 with input and output interfaces including without limitation, keyboard 134 and display 136. Suitable input and output peripherals can also include any of a variety of input or output peripherals, including but not limited to mouses, touchpads, printers and microphones. In general and without limitation the systems and methods described herein can be implemented on a variety of computing devices having a variety of forms including but not limited to mainframes, distributed systems, laptops computers, desktop computers and handheld devices such as tablets and smartphones.

Internal aspects of the routers 108, 110 referred to herein are shown in Router 110. For purposes of this disclosure unless otherwise expressed or implied, routers 108 and 110 can be considered to operate and be constructed identically. Routers 108, 110 both include an IP network adapter 138 for communication over the backbone network 107 connecting the routers 108, 110 to the controller 104, and a device subnetwork adapter 140 for communication over respective device branch networks 112, 114. According to one aspect of the present teachings, the IP network adapter 138 is a UDP/IP compatible adapter. According to another aspect of the present teachings, the device subnetwork adapter 140 is an MS/TP compatible network adapter. Routers 108, 110 also both include a processor 142 for processing and executing computer instructions 143 that can be stored, for example, on memory 144, which can take a variety of tangible, non-transient forms, as recited above with respect to memory 128 of controller 104.

The device 122, which is installed in an unconfigured state, includes a device subnetwork adapter 146 for communicating over the device subnetwork 114. According to one aspect of the present teachings, the device subnetwork adapter 146 is an MS/TP compatible network adapter. Device 122 further includes a processor 148 for processing and executing computer instructions 149 that can be stored, for example, on memory 150, which can take a variety of tangible, non-transient forms, as recited above with respect to memory 128 of controller 104 and memory 144 of routers 108, 110.

Figure 2:
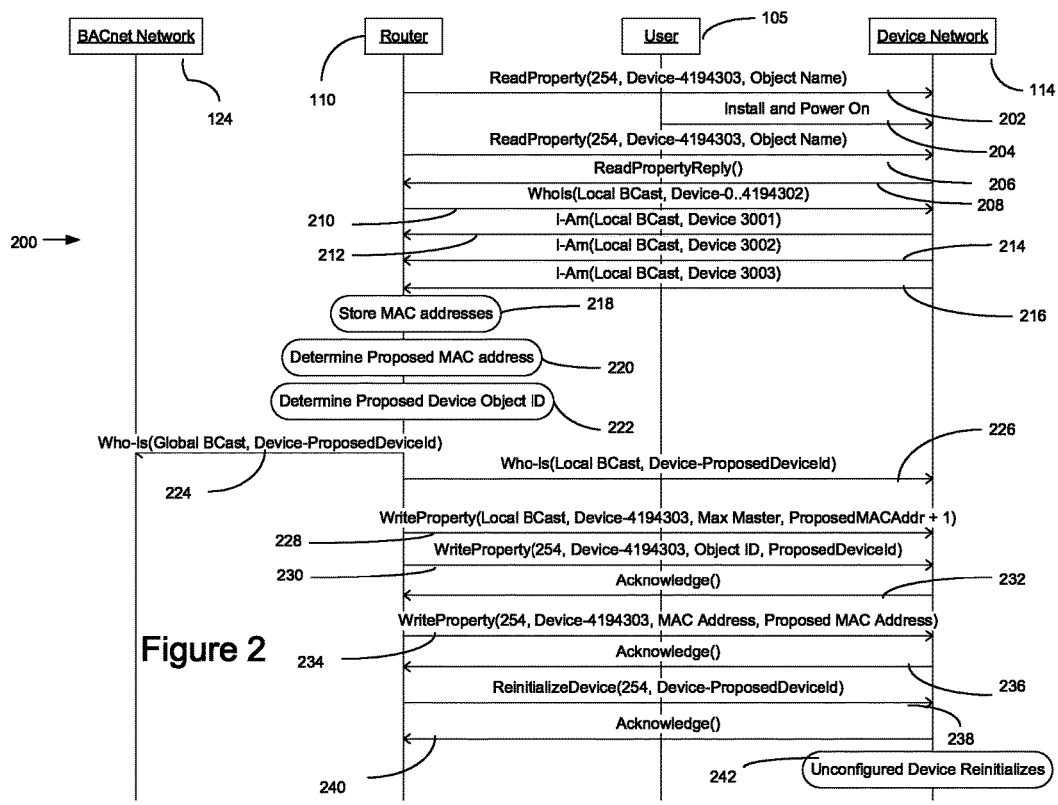
FIG. 2 illustrates a communication sequence chart 200 for a method of automatically configuring an unconfigured device 122.

With reference to FIG. 2, a communication sequence chart 200 illustrates a sequence of communications that can occur between router 110, the devices 119-122 on device network 114, the backbone network 107 and user 105. Instructions for performing the steps shown in FIG. 2 can reside as one or more of instructions 129 on memory 128 of the controller 104, as instructions 143 on memory 144 of router 110, or instructions 149 on memory 150 of device 122. At step 202, a periodic poll ReadProperty (254, Device-4194303, ObjectName) by the router 110 over the device network 114 polls for devices 115-122 that have the MAC address 254 and the device object ID of 4194303. The parameter "ObjectName" can refer to the value of the object name of the answering device. According to one aspect of the present teachings, the MAC address is preselected to be a relatively infrequently occurring MAC address on operating BACnet networks. As illustrated the selected MAC address is the MAC address at the end of the valid range of MAC addresses, corresponding to address 254. Information regarding the preselected MAC address applied in step 202 can be documented to assist the installing user 105 in avoiding conflict with previously installed devices on the branch network 114 with the MAC address 254. The selected device object ID used in the poll at step 202, 4194303, is a wildcard device object ID number such that the BACnet compatible receiving device 115-122 can be configured to treat as a "correct" device object ID for that particular device 115-122, whether or not that device 115-122 has been assigned a valid device object ID within the valid range of 0 to 4194302. Thus, a wildcard device object ID is one that the devices 115-122 can treat as corresponding to its device object ID, but that is outside of the valid range of device object IDs for devices on the BACnet network 124. According to another aspect of the present teachings, use of wildcard device object IDs prevents other devices on the BACnet network 124 from communicating with the unconfigured device 122 as if it is configured.

At step 204, a user such as user 105 installs a device 122 on a device network 114 and powers on the device 122. After the newly installed device 122 is installed and powered on, it receives one of the routers 110 periodic polls ReadProperty (254, Device-4194303, ObjectName) sent over device network 214 at step 206. It should be noted that any of a variety of properties in addition to ObjectName can be selected for the polling request, such as ObjectType, SystemStatus or others. According to one aspect of the present teachings, the property is chosen from one of the properties required by the BACnet protocol to be supported by devices 115-122. At step 208, the unconfigured device 122 sends a reply over the device network 114 in the form of a ReadPropertyReply( ) message, which indicates to router 110 that an unconfigured device is on the device network 114. Once router 110 receives the reply to the ReadProperty request made at MAC address 254, the router 110 issues a WhoIs request at step 210 over the device network 114, as indicated by the "Local BCast" destination address, and for any device having the device object ID in the range 0 to 4194302, as indicated by the "Device-0 . . . 4194302" parameter. According to another aspect of the present teachings, the range of device object IDs can equivalently be left unspecified, allowing any device 115-122 having a valid device object ID to respond with an IAm response. The IAm responses at steps 212-214 can include address information including MAC addresses and device object IDs of the responding devices. The WhoIs request and IAm response can therefore be used to determine network addresses of devices 115-121 on a BACnet network 124. The WhoIs request prompts IAm responses at steps 212-214 from configured devices 119-121 on the device network 114. Devices 119-121 that have a specified device object ID within range of the WhoIs request can issue a IAm response over the device network 114 identifying the responding device's address information, including the MAC address and device object ID number. According to one aspect of the present teachings, devices 119-121 issue IAm responses 212, 214 and 216 over the local device network 114, providing a MAC address and device object ID of the responding device 119-121. Unconfigured device 122 does not issue an IAm response as it has not been configured with a valid device object ID in the requested range.

With continued reference to FIG. 2, at step 218, the router 110 stores the addresses of the devices 119-121 that respond to the WhoIs request made at step 210. For example, with reference to FIGS. 1 and 2, router 110 can receive and store the IAm responses 212, 214 and 216 from devices 119-121, including the addresses of those devices. Based on the address information received in the IAm responses 212, 214 and 216, the router 110 can select a proposed MAC address, which can be assigned to the unconfigured device, at step 220. The proposed MAC address can be selected by a variety of methods. According to one aspect of the present teachings, the router 110 can select a proposed MAC address that is not already in use by reference to the stored MAC addresses received from the IAm responses 212, 214 and 216 from devices 119-121 on the device network 114. In just one example, the router 110 can choose the MAC address one higher than the highest in use MAC address. In another example, the router 110 can refer to a list of all allowed MAC addresses and chose the lowest valid MAC address that is not already in use. In yet another example, the router 110 can choose a random MAC address and check the random MAC address against the list of in use MAC addresses, and select such an address as the proposed MAC address. In addition to a proposed MAC address, the router 110 can determine a proposed device object ID at step 222 that can be assigned to the unconfigured device 122. The router 110 can select a proposed device object ID in a variety of suitable ways, including but not limited to by selecting from a predetermined list of valid device object IDs, or by calculating a value for the proposed device object ID, such as by multiplying the network number by 1000, and adding the proposed MAC address determined in step 220.

With further reference to FIG. 2, in step 224, the router 110 can broadcasts a WhoIs(Global BCast, Device-ProposedDeviceId) message, which is a global broadcast to the entire BACnet network that can prompt an IAm response from any device on BACnet network that has the device object ID equal to the selected proposed value of the device object ID determined in step 222 and denoted "Device-ProposedDeviceID." In step 226, the router 110 broadcasts a WhoIs(Local BCast, Device-ProposedDeviceId) message, which is a local message over the device network 114 that can prompt a IAm response from any device on device network 114 that has the device object ID equal to the selected proposed value of the device object ID. Step 226 can be omitted if the globally broadcast WhoIs at step 224 can reach the devices 119-122 on device network 114 coupled to the router 110 issuing the WhoIs message. Once sufficient time has passed after the WhoIs requests at steps 224 and 226 without an IAm response, the proposed MAC address and proposed device object ID can be considered available for use with the unconfigured device 122.

Once sufficient time has passed after the WhoIs requests at steps 224 and 226 without an IAm response, the router 110 can issue messages causing the unconfigured device 122 to adopt the proposed device object ID and proposed MAC address. According to one aspect of the present teachings, the device 122 has a writable MAC address and writable device object ID properties of the device object.

In step 228, the router sends a WriteProperty (254, Device-4194303, Object ID, Proposed Object ID) message. The WriteProperty message is addressed to the unconfigured device 122, which still recognizes the MAC address 254 and wildcard device object ID as corresponding to its MAC address and wildcard device object ID, according to the first two parameters "254" and "Device-4194303." If the proposed MAC address is greater than the last master on the local network the router 110 sends a local broadcast Write Property message to increase the Max Master property at step 228. The WriteProperty message at 230 directs the unconfigured device to write as its configured device object ID, referred to as "Object ID" in the third parameter, the proposed object ID which is referred to the "Proposed Object ID" in the fourth parameter. According to one aspect of the present teachings, for devices that do not have a writeable device object ID but instead a configurable device object ID, a message can be sent to the device to configure its device object ID to one of its possible configurable values. One such configurable device object ID has a predetermined multiple digit prefix followed by a selectable suffix. A variety of methods can be implemented to select a proposed device object ID with which to configure a device and select alternate proposed device object IDs when a device is not configurable to a particular proposed device object ID. At step 232, the device acknowledges the message sent at step 230. At step 234, the router 110 sends another WriteProperty message, this time WriteProperty (254, Device-4194303, MAC Address, Proposed MAC Address) message, again addressed to the unconfigured device, directing the unconfigured device 122 to write the proposed MAC address as its MAC Address, which address is referred to as "MAC Address" in the third listed parameter. The value of the proposed MAC Address is denoted as "Proposed MAC Address" in the fourth parameter. At step 236, the device acknowledges the message sent at step 234. The router 110 then sends a ReinitializeDevice message at step 238 to the unconfigured device 122 instructing the unconfigured device 122 to reinitialize, which message is acknowledged by the router 110 at step 240. The unconfigured device 122 then reinitializes at step 242. Upon reinitialization, the unconfigured device 122 becomes configured with a new MAC address and new device object ID, corresponding to the previously proposed MAC address and proposed device object ID.

Figure 3:
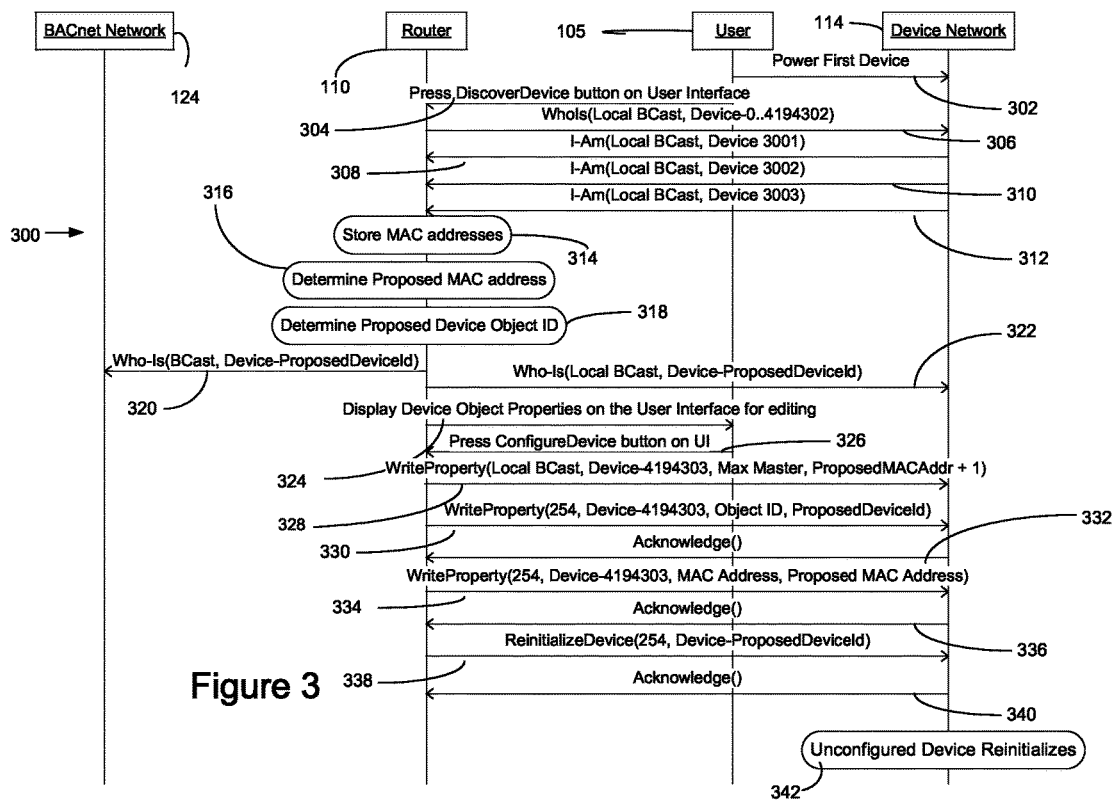
FIG. 3 illustrates a communication sequence chart 300 for a method of semiautomatically configuring an unconfigured device 122.

With reference to FIG. 3, according to another aspect of the present teachings, a semi-automated process of configuring an unconfigured device 122 is reflected in communications sequence 300. As with the steps performed in the sequence 200 shown in FIG. 2, instructions for performing the steps shown in FIG. 3 can reside as one or more of instructions 129 on memory 128 of the controller 104, as instructions 143 on memory 144 of router 110, or instructions 149 on memory 150 of device 122.

At step 302, a user such as user 105 installs device 122 on device network 114 and powers on the unconfigured device 122. At step 304, the user 105 issues a "Discover" command to the router 110, for example through a web-based interface available at controller 104, prompting the router 110 to issue a WhoIs broadcast at step 306 similar to that in step 210 shown in and described with reference to FIG. 2. According to one aspect of the present teachings, the issuance of a "Discover" command allows omission of the polling such as done in steps 202 and 206 shown in and described with reference to FIG. 2.

The IAm responses from devices 119-121 received at steps 308, 310 and 312, like responses 212, 214 and 216, can be used to determine the MAC addresses of the configured devices 119-121 on the device network 114. Devices 119-122 that have a specified device object ID within the broadcast range issue a WhoIs response over the device network 114 identifying the responding device's 119-121 address information, including the MAC address and device object ID number. As discussed in reference to FIG. 2, unconfigured device 122 does not issue an IAm response to the WhoIs request at step 306 as it does not have a valid device object ID. At step 314, the router 110 stores the addresses of the devices 119-121 that respond to the WhoIs message made at step 306. Thus, router 110 can receive and store the IAm responses 306, 308 and 310 from devices 119-121, including the addresses of those devices. At step 316, based on the address information received in the IAm responses 306, 308 and 310, the router 110 can select a proposed MAC address for the unconfigured device 122 as discussed herein with respect to FIG. 2. Also as discussed with regard to FIG. 2, at step 318 the router 110 can determine a proposed device object ID that can be assigned to the unconfigured device 122 in any of a variety of suitable ways, including but not limited to by selecting from a predetermined list of valid device object IDs, or by calculating a value for the proposed device object ID, such as by multiplying the network number by 1000, and adding the proposed MAC address.

With continued reference to FIG. 3, once the proposed device object ID and proposed MAC address are chosen the router 110 can issue local and global WhoIs messages 320 and 322 similar to WhoIs messages 224 and 226, respectively. As with messages 224 and 226, messages 320 and 322 can prompt IAm responses from any receiving device having the proposed device object ID. As discussed with reference to FIG. 2, step 322 can be omitted if the globally broadcast WhoIs at step 320 is configured to reach devices on the device network 114 coupled to the router 110 issuing the broadcast. Once sufficient time has passed after the WhoIs requests at steps 320 and 322 without an IAm response, the proposed MAC address and proposed device object ID can be displayed to the user 105 at step 324, for example at a user interface on the display 136 of controller 104 that displays a graphical interface of the router 110, allowing the user 105 to interact with the router 110. The user 105 can elect to change one or more of the proposed MAC address and proposed device object ID prior to the unconfigured device 122 adopting the proposed MAC address and proposed device object ID. If the user 105 does alter one or more of the proposed MAC address and proposed device object ID, the router 110 can perform a validation, for example, by repeating the WhoIs messages issued in steps 316 and 318 except including the user's proposed address information rather than proposed addresses initially proposed by the router 110. Other suitable methods of validation can be implemented.

Once any validation of user-selected proposed MAC address or proposed device object ID is complete, the user can accept the validated user-selected proposed MAC address and user-selected proposed device object ID and issue a "Configure" command at step 326, for example by entering the command in the router's 110 graphical user interface. Upon user entry of the command to configure the device 122, the router 110 sends a local broadcast Write Property message at step 328 to increase the Max Master property if the user-selected MAC address is greater than the last master on the local network. The router 110 then issues WriteProperty messages to unconfigured device 122 at steps 330 and 334, which messages prompt acknowledgements from device 122 at steps 332 and 336, respectively. Once the acknowledgement 336 is received by router 110, the router issues a ReinitializeDevice message to the unconfigured device 122 at step 338 prompting the unconfigured device 122 to reinitialize, which message is acknowledged by the device 122 at step 340. At step 342, the device reinitializes. After reinitialization, the unconfigured device is configured with a new MAC address and new device object ID, corresponding to the proposed MAC address and device object ID accepted by the user 105.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

While the present disclosure illustrates various embodiments, and while these embodiments have been described in some detail, it is not the intention of the applicant to restrict or in any way limit the scope of the claimed invention to such detail. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

The invention claimed is:

1. A router operable to communicate with a controller over a control network and one or more devices on a device network, comprising:
    a processor, and a non-transient computer readable medium including instructions that upon execution cause the router to:
        (i) poll for a device over the device network at a predetermined address;
        (ii) receive a valid response to the poll from an unconfigured device;
        (iii) upon receiving a valid response to the poll, broadcast an identification request to each device on the device network having a device object ID within a predetermined set of device object IDs;
        (iv) receive responses to the identification requests from each device on the device network having a device object ID within a predetermined set of device object IDs, the responses including the MAC address of the devices;
        (v) store the MAC addresses received in the responses to the identification requests;
        (vi) select a proposed MAC address based upon the stored MAC addresses;
        (vii) select a proposed device object ID, the non-transient computer readable medium including instructions that upon execution cause the router to determine the proposed device object ID based upon the proposed MAC address and a network number of the device network,
        (viii) poll the control network for a device having the proposed device object ID and determine whether a device has the proposed device object ID;
        (ix) transmit instructions to the unconfigured device to write the proposed object ID to non-transient computer readable medium of the unconfigured device;
        (x) transmit instructions to the unconfigured device to write the proposed MAC address to the non-transient computer readable medium of the unconfigured device.

2. The router of claim 1, wherein the router is a BACnet router, the device network is a MS/TP network, and the devices are BACnet devices in communication with the BACnet router over the MS/TP network.

3. The router of claim 1, further comprising:
    the non-transient computer readable medium including instructions that upon execution cause the router to transmit instructions to the unconfigured device to reinitialize after adopting the proposed MAC address and the proposed device object ID.

4. The router of claim 1, further comprising:
    the non-transient computer readable medium including instructions that upon execution cause the router to accept one or more of a proposed MAC address that is user-defined and a proposed device object ID that is user-defined.

5. The router of claim 4 further comprising:
    the non-transient computer readable medium including instructions that upon execution cause the router to receive a command from a user and upon receiving the command, transmit instructions to the unconfigured device to write at least one of the proposed MAC address that is user defined and the proposed object ID that is user-defined.

6. The router of claim 1, wherein the proposed device object ID is a wildcard device object ID.

7. The router of claim 1, further comprising:
    the non-transient computer readable medium including instructions that upon execution cause the router to:
        (i) transmit instructions to the unconfigured device to write the proposed object ID to non-transient computer readable medium of the unconfigured device upon determining that no device on the control network is assigned the proposed object ID; and,
        (ii) transmit instructions to the unconfigured device to write the proposed MAC address to the non-transient computer readable medium of the unconfigured device upon determining that no device on the device network is assigned the proposed MAC address.

8. A system comprising: a network device operable to communicate over the control network with the router of claim 1, the network device comprising:
    a processor, and a non-transient computer readable medium including instructions that upon execution cause the network device to:
        (i) receive the poll over the control network from the router at a predetermined address;
        (ii) transmit the valid response to the poll to the router;
        (iii) receive instructions from the router to write the proposed object ID unique over the control network to non-transient computer readable medium of the unconfigured network device; and,
        (iv) receive instructions from the router to write the proposed MAC address unique over the control network to the non-transient computer readable medium of the unconfigured network device.

9. The system of claim 8, wherein the router is a BACnet router, the control network is a MS/TP network, and the network device is a BACnet device that is in communication with the BACnet router over the MS/TP network.

10. The system of claim 8, wherein the non-transient computer readable medium of the network device includes instructions that upon execution cause the network device to receive instructions to reinitialize after adopting the proposed MAC address and the proposed device object ID.

11. The system of claim 8, further comprising:
    the non-transient computer readable medium of the network device includes instructions that upon execution cause the router to accept one or more of a proposed MAC address that is user-defined and a proposed device object ID that is user-defined.

12. The device of claim 8, wherein the proposed device object ID is a wildcard device object ID.

13. A method of configuring a device on a device network in communication with a router on a control network, comprising:
    installing an unconfigured device on the device network and power up the device;
    polling for a device over the device network at a predetermined address with the router;
    receiving the polling from the router at the device and transmitting a presence response from the device to the router;

receiving a valid response to the polling at the router;
broadcasting, from the router upon the router receiving the valid response to the polling, an identification request to each device on the device network having a device object ID within a predetermined set of device object IDs;
receiving, at the router, responses to the identification requests from each device on the device network having a device object ID within a predetermined set of device object IDs, the responses including the MAC address of the device;
storing in non-transient computer readable medium of the router the MAC addresses received in the responses to the identification request as corresponding with a device object ID;
selecting a proposed MAC address based on the stored MAC addresses;
selecting a proposed device object ID;
broadcasting from the router over the control network an identification request to a device having the proposed device object ID; and
executing instructions at the router to write the proposed device object ID and proposed MAC address to a non-transient computer-readable medium of the device upon determining no valid response has been received to the identification request from device having the proposed device object ID,
wherein the selecting a proposed device object ID step includes executing instructions with the router that upon execution select a device object ID not associated with a MAC address, and
wherein the selecting a proposed device object ID step includes executing instructions with the router that upon execution select a device object ID based on a network number of the device network and the proposed MAC address.

14. The method of claim 13, wherein the selecting a proposed MAC address step includes executing instructions with the router that upon execution select a MAC address distinct from the stored MAC addresses.

15. The method of claim 13, wherein the selecting a proposed MAC address step includes a user manually selecting a proposed MAC address.

16. The method of claim 13, wherein the selecting a proposed MAC address step includes a user manually selecting a proposed MAC address.

* * * * *